United States Patent Office 3,104,118
Patented Sept. 17, 1963

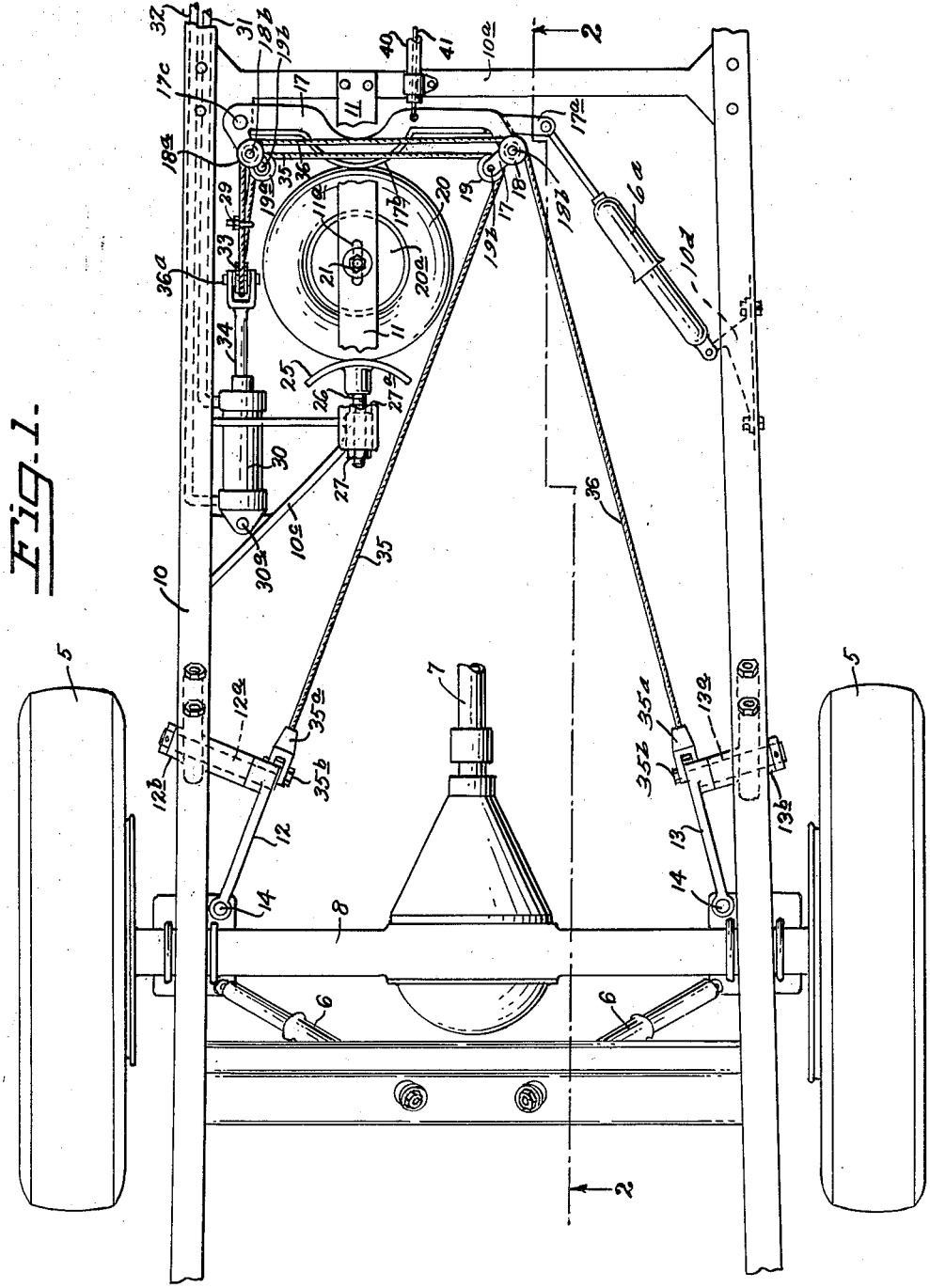

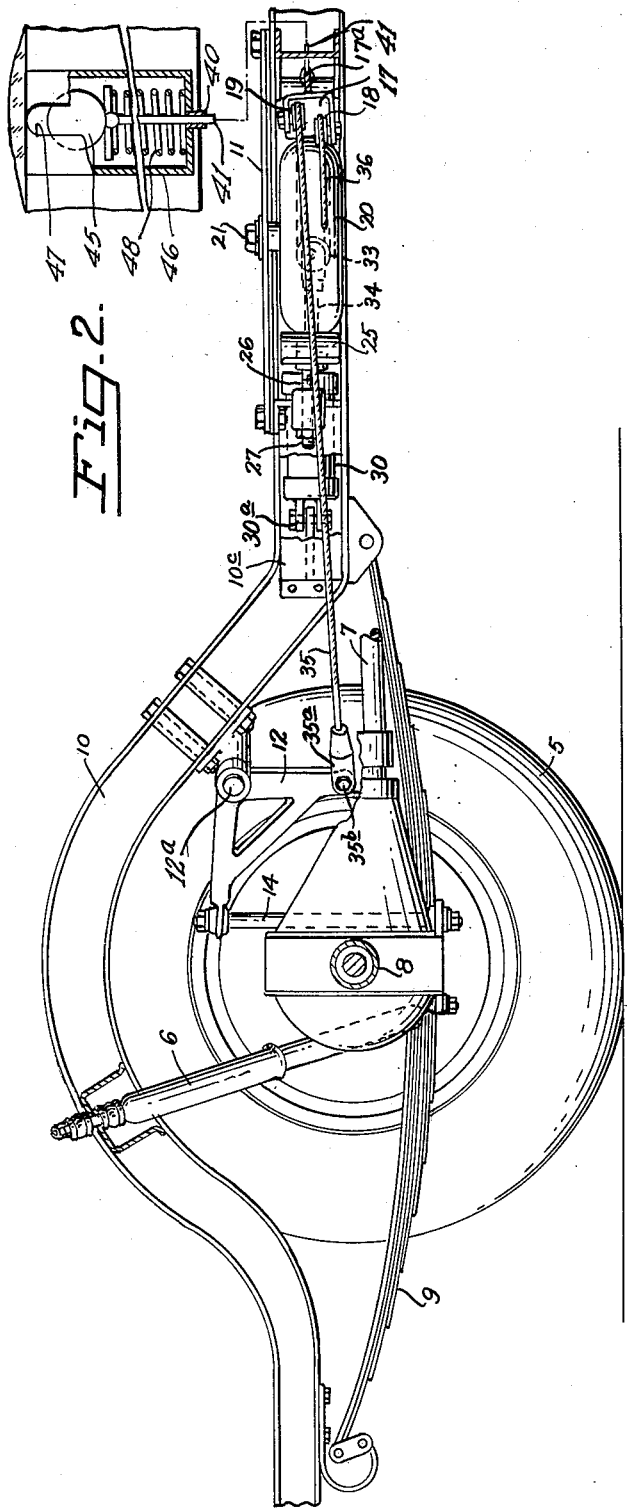

3,104,118
DEVICE FOR CHANGING THE SPRING RATE
OF A VEHICLE SUSPENSION SYSTEM
Brooks Walker, 1280 Columbus Ave.,
San Francisco 11, Calif.
Filed May 12, 1960, Ser. No. 28,700
5 Claims. (Cl. 280—124)

This invention pertains to improvement in vehicle suspension systems and particularly to means for varying the support of the rear of the vehicle. This in accomplished by means that transfer the vertical motion of the rear axle to horizontal motion by the use of bell cranks and cables and resist such horizontal motion by the compression of a single pneumatic flexible device, such as a tire of smaller diameter than the diameter of the rear tires of the vehicle.

Another object is to load and unload such an auxiliary support by a hydraulic or pneumatically operated cylinder acting on said cables.

Another object is to actuate such a device with the power available to operate the power steering through a leveling valve of conventional design.

Another object is to locate the controls near the pump and power steering.

Another object is to operate the resilient means by a remote control from the motion of the rear axle or bell crank to effect leveling and prevent continuous circulation of power steering fluid from the pump to the rear of the vehicle to the normal location of a self-leveling valve.

Another object is to keep the hydraulic control for leveling well forward of the rear tires to reduce the piping from the engine power source and thereby reduce the cost.

Another object is to provide a visual indicator of the rear axle motion, available in the driver's compartment, so that the driver can judge the auxiliary support needed in case a manual override control is desired in order to get higher frame to ground clearance, or a firmer ride is desired.

Another object is to reduce the action of the auxiliary yieldable means relative to the motion of the rear axle with respect to the vehicle frame. By this construction the approximate 10 inches plus or minus of axle travel is reduced to about one-half that much. This reduced action results in a better ratio for the compressibility of the auxiliary tire. If the rear springs of a vehicle have a rate of about 115 lbs. per inch each which might be about right for a light load of only the driver or driver and one passenger; for eight passengers in a station wagon with luggage 200 lbs. per inch might be a desirable rate.

Another object is to have an extra shock absorber connected to the action of the auxiliary support to change the shock resistance when the auxiliary support is fully active as compared to the shock absorbed action when the auxiliary support is inactive.

Other objects will be more particularly pointed out in the accompanying specification and claims.

Further objects, features and advantages of this invention will become apparent from a consideration of the following description, the appended claims and the accompanying drawing in which:

FIG. 1 is a plan view partly cut away showing one form of this invention.

FIG. 2 is a longitudinal sectional view looking along the line 2—2 in FIG. 1;

FIG. 3 is a reduced schematic side view showing the plumbing and height control;

FIG. 4 is a fragmentary plan view showing an alternative mounting for the hydraulic cylinder and cable actuating pulley in this invention.

In all figures like numerals of reference refer to corresponding parts.

In FIGS. 1–3 I have shown a vehicle having a frame 10, rear axle 8, rear tires 5, rear springs 9 for supporting a light load and auxiliary support tire 20 connected to the rear axle by arm 17, cables 35 and 36, bell cranks 12 and 13, tie rods 14 which connect the rear arm of bell cranks 12 and 13 to the rear axle 8. Bell cranks 12 and 13 are pivoted on axles 12a and 13a, respectively, and axles 12a and 13a are supported in bearings 12b and 13b, respectively, which are each suitably secured to the vehicle frame 10. Cables 35 and 36 are pivoted to bell cranks 12 and 13, respectively, by means of clevices 35a and pins 35b. Cable 36 is attached to bell crank 13 by clevice 35a and pin 35b.

The arm 17 is pivoted adjacent one end to the frame 10 by means of a pin 17c. At its ends the arm 17 carries pulleys 18 and 18a supported on pins 18b, and pulleys 19 and 19a which are pivoted to arm 17 by pins 19b. Cable 35 is trained about pulleys 19 and 19a, and cable 36 is trained about cables 18 and 18a. In addition, the cable 36 is trained about a pulley 33 and connected by a clamp 29 to cable 35. If desired, the cables 35 and 36 may take the form of a single continuous cable.

The rear axle 8 is also connected to frame 10 by shock absorbers 6; an auxiliary shock absorber 6a is connected between a bracket 10d on frame 10 and an extension 17a for arm 17 to provide auxiliary snubbing when auxiliary support is being provided through auxiliary support tire 20.

A hydraulic control cylinder 30 is pivoted to a bracket 10c on frame 10 by a pin 30a. Clyinder 30 has a piston rod 34 provided with a forked end which supports a pin 36a which rotatably supports the pulley 33. Pulley 33 pulls on cables 35 and 36 which can be one continuous cable.

Auxiliary tire 20 has a wheel 20a and axle 21 which is supported by a bracket 11 which is bolted to cross frame 10a at its front end and to bracket 10c at its rear end and has slot 11a for supporting axle 21 and still allow fore and aft action of axle 21 when tire 20 is compressed between curved heel 17b of arm 17 and curved shoe 25. Shoe 25 is supported on threaded stem 26 and adjusted fore and aft by nuts 27 and 27a on each side of the bracket 10c through which stem 26 passes. The control for cylinder 30 and piston rod 34 which changes the load carried by cables 35 and 36 through the varying compression of auxiliary tire 20 is shown schematically in FIG. 3. Engine 66 which drives the vehicle through drive shaft 7 drives power steering pump 60 through pulley 64, belt 63 and pump pulley 62. Reservoir 61 is mounted on pump 60 which has the usual connections and flow control valves common to current practice but not shown as it forms no part of this invention.

Height control valve 80 is connected to pump 60 by pressure line 68. Line 69 carries pressure to power steering unit 65 either in the open center position or when the piston rod 34 is moving in either direction.

Line 70 returns liquid from power steering unit 65 to reservoir 61. Line 31 goes to the front end of cylinder 30 from valve 80 to cause piston rod 34 to be retracted to increase the auxiliary support through compression of auxiliary tire 20. Line 32 goes to the rear of cylinder 30 and connects the closed end of cylinder 30 to reservoir 61.

The operation of valve 80 may be similar to the valve shown in Patent No. 2,940,476, entitled Open Center Four Way Valve, assigned in full to applicant, or it may be any other type of suitable height control or leveling valve. The valve 80 is actuated mechanically by a link 72 which extends from the valve 80 to the operator's compartment. The advantage of transmitting the motion of the axle forward to a valve near the pump reduces the length of tubings and reduces the cost accordingly. The cost of transmitting the axle motion forward by wire cable or rod is much less than carrying one or more high pressure tubes back to or near the rear axle.

The rear axle motion and position is transmitted to the driver's compartment by means of cable 41 through conduit 40 to indicator ball 45 operating in housing 46 and visible through slot 47. Coil spring 48 presses against indicator ball 45 and is connected at its upper end to cable 41 to keep control cable 41 in tension at all times. The height of ball 45 indicates the axle 8 motion relative to frame 10 in reduced ratio. The position of ball 45 in slot 47 also indicates the amount of frame lift in case of override control of the auxiliary suspension system.

In FIGURE 4, the hydraulic cylinder assembly 30 is illustrated mounted on the pin 30a carried by the frame bracket 10e at a position forwardly of the transverse frame member 10a. In this installation, the cables 35 and 36 are trained about the opposite sides of the pulleys 18a and 19a from that illustrated in FIGURE 1. In the FIGURE 4 installation, when the cylinder assembly 30 is operated to retract the piston rod 34, the arm 17 is swung in a clockwise direction to compress tire 20 as viewed in FIGURE 1. The advantage of the FIGURE 4 installation is that the lengths of the lines 31 and 32 are reduced.

In the operation of the system of this invention, when the rear end of the vehicle is to be elevated, or when the resistance of the springs 9 to up and down movement of frame 10 is to be increased, such as when an unusually heavy load is to be carried in the vehicle, the piston rod 34 is retracted to swing the arm 17 in a clockwise direction to compress the tire 20, which constitutes a compressible chamber or yieldable means, between the shoe 25 and the heel 17b of arm 17. The increased tension in cables 35 and 36 provides for a rotation of the bell cranks 12 and 13 in a direction to move the tie rods 14 downwardly to increase the bow of the springs 9 and elevate the rear end of the vehicle frame 10 and increase the combined resistance of the springs 9 and tire 20 to up and down movement of frame 10. The extent of upward movement of the rear end of the vehicle 10 relative to the rear axle 8 is indicated by the location of the ball 45 which is visible in the operator's compartment.

During operation of the vehicle, any flattening out of the leaf springs 9 is yieldably resisted by the resistance of the tire 20 to further compression and the resistance of the tire 20 to compression maintains the cables 35 and 36 taut. As a result, the tire 20 functions to provide an auxiliary pneumatic suspension for the rear end of the vehicle. Whenever a firmer ride is desired for the vehicle, the hydraulic cylinder assembly 30 can be actuated to increase the bow of the springs 9 and the resistance of the tire 20 to further compression. By varying the contours of the heel 17b and the shoe 25, the degree of resistance of tire 20 to travel of lever 17 may be varied to provide the desired auxiliary suspension or support.

It will be understood that the specific construction of the improved vehicle suspension system which are herein disclosed and described is presented for purposes of explanation and illustration and is not intended to indicate limits of the invention, the scope of which is defined by the following claims.

What is claimed is:

1. In a vehicle having a frame with spaced side rail elements, a pair of road wheels at the front and at the rear of the frame, wheel supporting means, spring means interconnecting said frame and wheel supporting means, a pair of bell cranks having the center and one arm pivoted to the frame and the rear wheel supporting means respectively, a lever pivoted at one end to one said rail element and at the opposite end to the opposite said rail element through a shock absorber, a pair of cables, one cable having one end connected to the second arm of one said bell crank, the other cable connected to the second arm of the other said bell crank, a pair of pulleys at opposite ends of said lever, said cables extending through each said pair of pulleys, a supporting member on said frame, resilient means engaging the lever between said pulleys and engaging said supporting member, and a ram connected to the frame and to the other ends of the cables for drawing the lever against said resilient means which supports a portion of the vehicle load.

2. In a vehicle having a frame, a pair of road wheels at the front end and at the rear end of the frame, wheel supporting means, spring means interconnecting said frame and wheel supporting means, a pair of bell cranks having the juncture between the ends pivoted to the frame and one arm pivoted to the rear wheel supporting means, a lever pivoted at one end to one side of the frame, a first pair of pulleys on the opposite end of the lever, a second pair of pulleys on the lever adjacent to the pivot thereof, a pair of cables, one connected to the second arm of each said bell crank, said cables passing through said pairs of pulleys, a support member on said frame, resilient means acting against a portion of said lever located between said pair of pulleys and said support member for supporting a portion of the vehicle load on said frame, and means on said frame secured to the other ends of said cables for varying the force thereon and the pressure on said resilient means between said lever and support member.

3. In a vehicle having a frame, a pair of road wheels at the front and at the rear of the frame, wheel supporting means, spring means interconnecting said frame and wheel supporting means, a pair of bell cranks having the center and one arm pivoted to the frame and the rear wheel supporting means respectively, a lever pivoted at one end to the frame and at the opposite end to the frame through a shock absorber, a pair of pulleys on said lever adjacent to the shock absorber, a second pair of pulleys adjacent to the lever pivot, a pair of cables having one end connected to the second arm of said bell cranks and extended over both pairs of pulleys, a supporting member on said frame, resilient means engaging said member and said lever between said pairs of pulleys, said resilient means supporting a portion of the vehicle load on said frame when a force is applied thereto by the lever, and a ram connected to the other ends of said cables for applying a force to the lever and to said resilient means, said ram extending forwardly of said lever and secured to the forward portion of said frame.

4. In an auxiliary support for the rear end of a vehicle having a chassis frame and rear wheel supporting means which are interconnected by spring means, a pair of bell cranks also interconnecting the rear wheel supporting means and said chassis frame with a free arm extending therefrom, a lever having one end pivoted to one side of the chassis frame and the opposite end connected to a hydraulic shock absorber connected to the other side of said chassis frame, a pair of cables having one end connected to the free arm of the bell cranks and passing through a pair of pulleys disposed at a medial portion of said lever and through a pair of pulleys on the lever near the pivot thereof, a backup member fixed to said frame and spaced from said lever, an inflatable pneumatic tire engaging said lever between said pairs of pulleys, and abutting said member, and a ram connected to the other ends of said cables for applying a load thereto and to said lever which is transferred to the tire.

5. An auxiliary support as recited in claim 4, wherein said backup member and lever engage said tire with oppositely presenting concaved areas for increasing the pressure rate of the tire as the load thereon increases.

References Cited in the file of this patent

UNITED STATES PATENTS

| | | |
|---|---|---|
| 2,825,580 | Walker | Mar. 4, 1958 |
| 2,872,209 | Walker | Feb. 3, 1959 |
| 2,893,505 | Schultz | July 7, 1959 |